(12) United States Patent
Pronk et al.

(10) Patent No.: US 7,506,049 B2
(45) Date of Patent: Mar. 17, 2009

(54) SHARED MEDIUM COMMUNICATION SYSTEM

(75) Inventors: Serverius Petrus Paulus Pronk, Eindhoven (NL); Ronald Rietman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 427 days.

(21) Appl. No.: 10/538,097

(22) PCT Filed: Nov. 12, 2003

(86) PCT No.: PCT/IB03/05132

§ 371 (c)(1),
(2), (4) Date: Jun. 8, 2005

(87) PCT Pub. No.: WO2004/054176

PCT Pub. Date: Jun. 24, 2004

(65) Prior Publication Data

US 2006/0056279 A1    Mar. 16, 2006

(30) Foreign Application Priority Data

Dec. 11, 2002    (EP) ................... 02080228

(51) Int. Cl.
*G06F 15/173*    (2006.01)
*G06F 15/16*    (2006.01)

(52) U.S. Cl. .................... 709/224; 709/235; 709/226; 709/227

(58) Field of Classification Search .............. 709/229, 709/223, 224, 225, 226, 227, 228, 232, 235, 709/237; 370/447, 468, 431, 462
See application file for complete search history.

(56) References Cited

U.S. PATENT DOCUMENTS

| | | | | |
|---|---|---|---|---|
| 5,289,462 | A * | 2/1994 | Ahmadi et al. | 370/232 |
| 5,608,870 | A * | 3/1997 | Valiant | 711/100 |
| 5,917,822 | A * | 6/1999 | Lyles et al. | 370/395.4 |
| 6,549,515 | B1 * | 4/2003 | Sourani et al. | 370/232 |
| 6,785,252 | B1 * | 8/2004 | Zimmerman et al. | 370/337 |
| 6,925,068 | B1 * | 8/2005 | Stanwood et al. | 370/329 |
| 2002/0003806 | A1 * | 1/2002 | McKinnon et al. | 370/437 |
| 2002/0176361 | A1 * | 11/2002 | Wu et al. | 370/231 |
| 2006/0056454 | A1 * | 3/2006 | Dispensa et al. | 370/468 |

OTHER PUBLICATIONS

Leligou H. C. et al: Hardware Implementation of Multimedia Driven HFC MAC Protocol, vol. 1, No. 29, May 2000, pp. 273-276.

* cited by examiner

*Primary Examiner*—John Follansbee
*Assistant Examiner*—Karen C Tang

(57) ABSTRACT

In a shared medium communication system, a common measure for avoiding collisions of application data is a request grant mechanism. Secondary stations contending for upstream bandwidth send requests on a shared medium, wherein each request is answered by a grant from the primary station. The efficiency of such a system may be improved if at least two access requests are merged into a multi request.

10 Claims, 2 Drawing Sheets

SHARED MEDIUM COMMUNICATION SYSTEM

The invention relates to a shared medium communication system comprising:
 a primary station arranged to receive an access request, process the access request and send a grant in response to the access request;
 a secondary station for sending the access request and for receiving the grant; and
 a shared medium coupling the primary station with the secondary station.

The invention also relates to a secondary station for sending an access request to a primary station and for receiving a grant from the primary station in response to the access request, the access request comprising a request for access to a shared medium.

The invention also relates to a primary station for receiving an access request from a secondary station, for processing the access request and for sending a grant to the secondary station in response to the access request, the access request comprising a request for access to a shared medium.

The invention also relates to a method of operating a shared medium communication system, the method comprising:
 a primary station receiving an access request, processing the access request and sending a grant in response to the access request,
 a secondary station sending the access request to and receiving the grant from the primary station, the access request comprising a request for access to a shared medium.

The invention also relates to a method of sending an access request to a primary station and receiving a grant from the primary station in response to the access request, the access request comprising a request for access to a shared medium.

The invention also relates to a method of receiving an access request from a secondary station, processing the access request and sending a grant to the secondary station in response to the access request, the access request comprising a request for access to a shared medium.

The invention also relates to a signal for use in a shared medium communication system.

An embodiment of the shared medium communication system described in the opening paragraph is known from the DOCSIS standard: "Data-Over-Cable Service Interface Specifications", Radio Frequency Interface Specification, SP-RFIv2.0-I02-020617 as issued by Cable Television Laboratories, Inc.

Each secondary station can send data traffic upstream to the primary station. The secondary station is a cable modem (CM) in a DOCSIS system, but may also be a set-top box, a television or a receiver. The primary station is a cable modem termination system (CMTS) in a DOCSIS system, but it may also be a head-end or a base station.

The data sent by all secondary stations is carried by the shared medium. When the data sent by two or more secondary stations collides on the medium, however, the data becomes unintelligible at the primary station.

A measure to prevent such a collision, which is described in the DOCSIS standard, is a request-grant mechanism. A secondary station that wants to use the medium sends an access request to the primary station. The primary station arbitrates between contending secondary stations and sends a grant downstream which indicates the secondary station that may use the medium. A secondary station may only send its data upstream after having received the grant. The request-grant mechanism prevents collisions between application data, but it does not prevent collisions between requests, which may be resolved with a collision resolution protocol. The request-grant mechanism is commonly applied in shared medium communication systems including systems for media like coaxial or twisted pair cables, fiber, hybrid fiber coax (HFC) systems, and systems based on a passive optical network (PON). To make it fit for transmission over the medium, the access request is usually wrapped in a frame by functions in a lower layer of the ISO stack. This adds an overhead to each separate access request.

Each secondary station can handle several simultaneous service flows. A service flow can be seen as a unidirectional transport service of the secondary station. Handling a service flow by the secondary station can involve shaping, policing, and prioritizing the traffic in accordance with so-called quality of service traffic parameters defined for the service flow.

Each service flow generates its own access requests at the secondary station. Therefore, the access requests of all service flows contend for access to the medium This deteriorates the performance of the communication so; especially it increases access delay.

The known shared medium communication system has a relatively low efficiency in handling the access requests and a relatively high access delay.

It is an object of the present invention to provide a shared medium communication system of the kind described in the opening paragraph, which has a relatively high efficiency in handling the access requests.

The object is realized in that the secondary station is arranged to merge several access requests into a multi-request and send the multi-request to the primary station, and in that the primary station is arranged to receive the multi-request, process the multi-request and send the grants in response to the access requests merged in the multi-request.

The efficiency of the system in handling the access requests is improved because of the savings on the overhead of multiple separate access requests. Another advantage is that the access delay is reduced, because the merged access requests cannot mutually contend for access to the shared medium.

Advantageously, the access requests merged may also comprise a multi-request.

Advantageously, the multi-request is represented in a DOCSIS request frame by encoding it in the bits that indicate the so-called service ID (SID) and the request size, being the number of requested mini-slots. All these bits, apart from a prefix, are available for encoding the multi-request. At least one of the bits encodes the SIDs of the merged access requests. At least one of the remaining bits encodes the request sizes of each of the merged access requests. This has the advantages that ordinary DOCSIS request frames can be used.

Advantageously, the multi-request is made fit for transmission by putting it in a DOCSIS vendor-specific frame. This can be indicated in the FC_PARM field of a DOCSIS MAC frame by an arbitrary but specific bit combination, which can for example be included in a future standard. This has the advantage that there are more bits available for encoding the multi-request. This increases the number of access requests that can be efficiently merged in the multi-request. The so-called Req./Data transmit opportunity can be used for transmission of vendor-specific MAC frames.

In an embodiment of the shared medium communication system according to the invention, the secondary station is arranged to adapt the merging of the access requests in dependence on histories of access previously merged, multi-requests previously sent and/or grants previously received.

In an embodiment of the shared medium communication system according to the invention, the secondary station is arranged to adapt the sending of the multi-request in dependence on histories of access requests previously merged, multi-requests previously sent and/or grants previously received.

Advantageously, the two above adaptations comprise combining parameters of at least two access requests that pertain to a single service flow. One example is summing the data sizes of at least two consecutive access requests for data transmittal. Another example for a slotted medium is summing the requested number of slots of at least two consecutive access requests. Yet another example inspired on the DOCSIS standard, is summing the requested number of so-called mini-slots of at least two request frames from a single service flow.

Advantageously, these adaptations exploit the trade-off between the potential gains in merging two particular access requests and the disadvantages of an actual collision. If, on the one hand, there is a relatively high traffic load on the system, it pays off to merge a relatively high number of access requests into the multi-request. If, on the other hand, there is a relatively low traffic load on the system, there is relatively little gained because access requests are seldomly merged. The actual traffic load can be estimated by deriving from the histories.

Advantageously, the primary station obtains the access requests contained in the multi-request and processes each access request as if it was received separately.

Advantageously, the primary station uses a means for processing access requests partially or as a whole, also for processing the multi-request.

The above object and features of the present invention will be more apparent from the following description of the preferred embodiments with reference to the drawings wherein.

Figure 1:
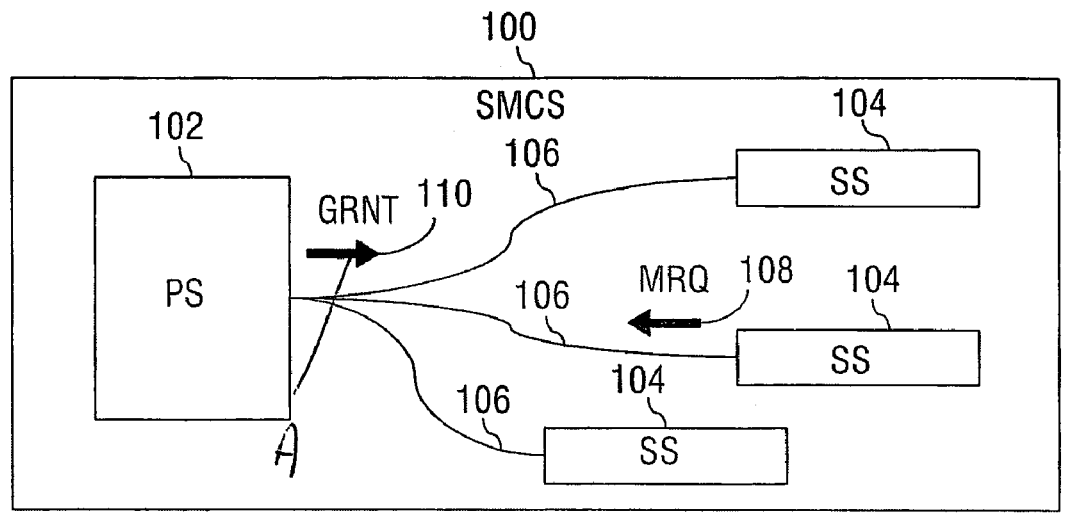
FIG. 1 shows a block diagram of an embodiment of a communication system according to the invention.

FIG. 1 shows a block diagram of an embodiment of a communication system according to the invention. A shared medium communication system 100 comprises a primary station 102 and at least one secondary station 104. The primary station may be a cable modem termination system (CMTS), but it may also be a head-end, a concentrator, a management center or a base station. The secondary station may be a cable modem (CM), but it may also be a set-top box, a television, a network terminator, a receiver or so-called customer premises equipment.

A shared medium 106 couples the primary station 102 with each secondary station 104. The medium and the network usually have a tree topology, but also bus or star topologies are possible. The medium may be coaxial or twisted pair cables, fibers, hybrid fiber coax (HFC) or a passive optical network (PON).

To avoid collisions on the shared medium 106, each secondary station 104 has to send a request 108 to the primary station 102. Only after receiving a grant 110, the secondary station 104 can send further data to the primary station 102. The further data may comprise any content, like for example audio and/or video streams, data files, transactions, subscriber feedback, other broadcasts. Instead of sending several separate requests 108, a secondary station 104 can merge the requests 108 into a multi-request 108 and send the multi-request 108 to the primary station 102. After receiving the multi-request 108, the primary station 102 processes the multi-request 108 and sends grants 110 in response to the merged requests in the multi-request 108.

Figure 2:
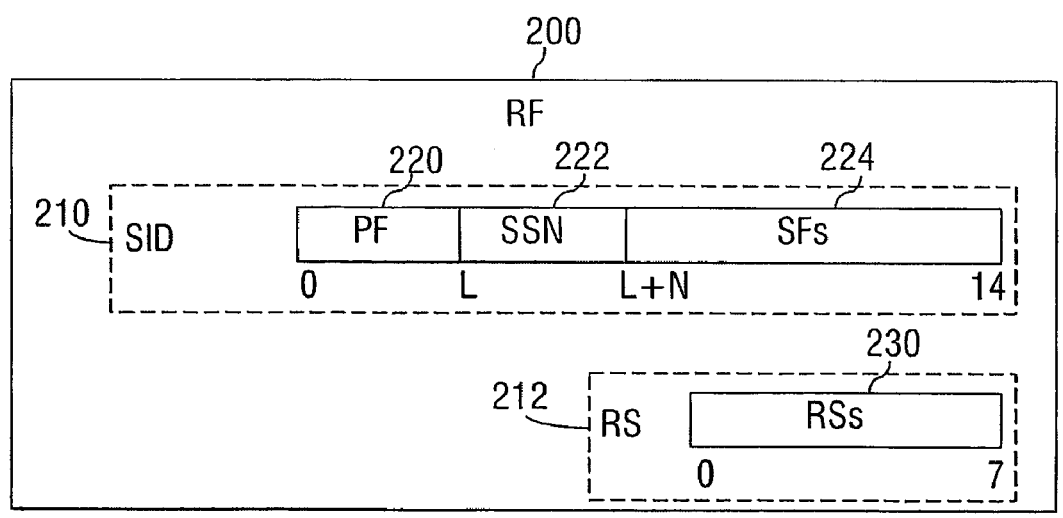
FIG. 2 shows a multi-request for use in an embodiment of a communication system according to the invention.

FIG. 2 shows a multi-request for use in an embodiment of a communication system according to the invention. The multi-request is represented in a DOCSIS request frame (RF) 200. A request frame is typically composed of a payload and a header.

The payload of a DOCSIS request frame 200 consists of a 14-bit SID 210 and an 8-bit request size 212. The header (not shown) includes physical-layer overhead such as:

a guard band for safely separating subsequent bursts from different secondary stations;

a preamble that is required for demodulation of the received burst;

and some MAC-layer overhead, such as:

a control field for identifying a request as such and a check sequence for error detection.

As a result, only a relatively small part of the request frame is dedicated to the payload.

According to the invention, a special SID management scheme and a request-partitioning rule can be used as detailed in the following description.

The SID 210 is further distinguished in a prefix (PF) 220 of L bits, a secondary station number (SSN) 222 of N bits and requesting service flows (SFs) 224 which is a field of the remaining M bits. For a DOCSIS request frame 200, $M=14-L-N$.

Predefined prefixes 220, for example '01' and '001', are used to indicate brand secondary stations or other secondary stations capable of merging access requests. The primary station treats a brand secondary station in a special way. So-called special SIDs (SSIDs) start with one of these prefixes 220. All other SIDs are called normal SIDs (NSIDs).

The M bits of the requesting service flows 224 can be used to create a set of M SSIDs for the secondary station indicated by the SSN 222. Each M bit represents a service flow. A bit is set to indicate a merged request for the respective service flow. If multiple bits are set, the multi-request contains requests for each of the respective service flows. The maximum number of set bits is bounded from above by R, which is in turn bounded by 8 for a DOCSIS frame 200. For each bit pattern of the requesting service flows 224, a structuring of the request size 212 into a number of request subfields is predefined. Consequently, with r bits set in the requesting service flows 224, the 8 bits are subdivided into r successive subfields of size $f_{r1}, f_{r2}, \ldots, f_{rr}$ respectively, with for any r the sum over i of $f_{ri}$ being 8. Subfield i encodes the request size of the merged request for the service flow of the ith set bit in the requesting service flows 224.

In a concrete example, the prefix used to indicate a brand secondary station is the bit string '01', with $L=2$. The secondary station number is encoded in the next 8 bits, so $N=8$, implying a maximum of 256 brand secondary stations for this prefix. The remaining $M=14-2-8=4$ bits are available for encoding the service flows 224. Taking $R=2$, so that at most 2 requests are merged in the multi-request, the subdivision of the original request field can be, for example: $f_{11}=8$, and $f_{21}=f_{22}=4$. That is, if only one SSID is represented in the combined SSID, then its request size can be up to 255 (8 bits), whereas, if there are 2 SSIDs represented in the combined SSID, each of them has a maximum request size of 15 (4 bits). As an example of the latter case, if the multi-request contains a SID 210 equal to the bit string 01 11001011 0101 and a request size 212 equal to the bit string 1001 0111, then the request for SSID 01 1100 1011 0100 has request size 1001 (=9) and the request for SSID 01 1100 1011 0 0001 has request size 0111 (=7).

People skilled in the art can think of alternative ways to encode multi-requests in a request frame.

The number of available SSIDs has an upper limit for each secondary station. Therefore, the primary station executes some logic to determine if a SSID or a NSID is assigned upon the creation of a new service flow at a secondary station.

A secondary station may have separate sets of SSIDs assigned to it, provided that it treats them independently, just like the simultaneous presence of more than one NSID. One possibility to implement this at the brand secondary station is to give SSIDs priority over NSIDs, each of them being handled in FCFS order. Alternatively, the access request and the multi-requests could be served in FCFS, a round robin, or otherwise fair manner. Finally, it is possible that SSIDs are also assigned to non-brand secondary stations, but the primary station should consider these as NSIDs.

Merging requests generally reduces the maximum request size of the merged requests. One option to alleviate the impact is to use piggybacking. A first request only requests a small number of mini-slots to transmit only a part of the frame. The request for the next part of the frame is attached to the previous part of the frame.

Figure 3:
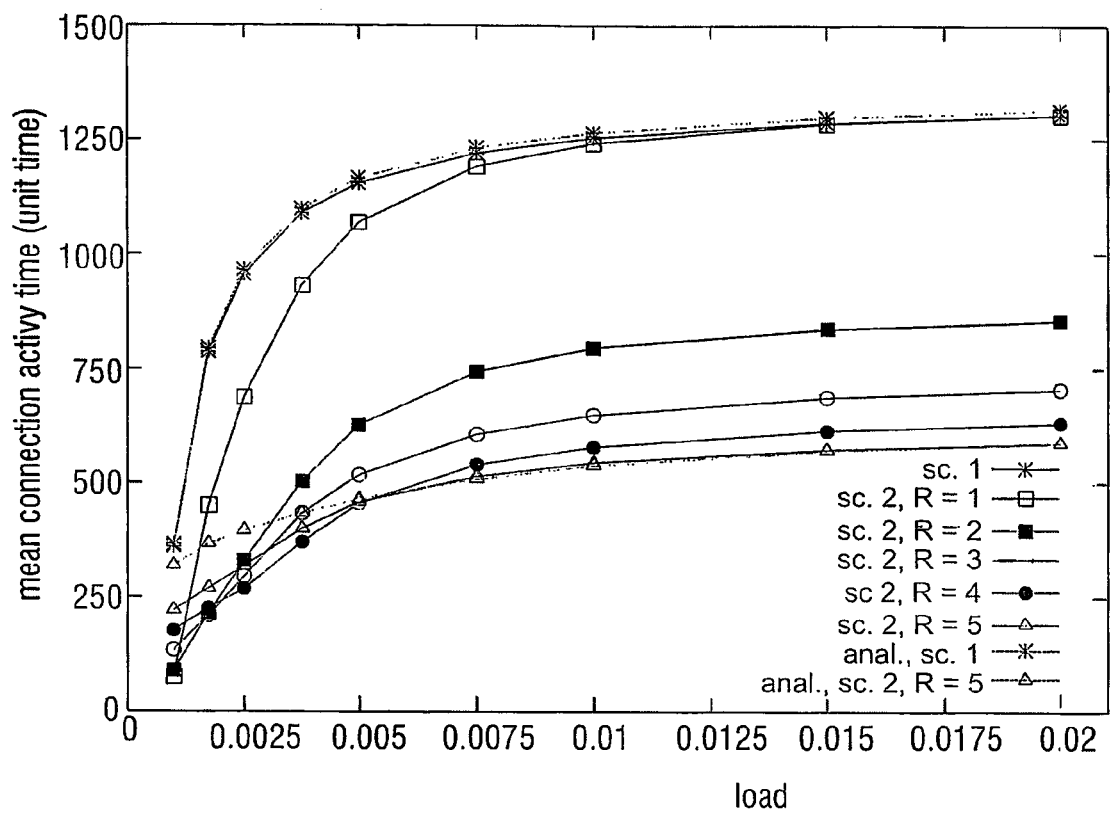
FIG. 3 shows some graphs illustrating the performance of a communication system according to the invention.

FIG. 3 shows some graphs illustrating the performance of a communication system according to the invention. In this case the system consists of 100 secondary stations and has 5 service flows at each secondary station. Shown is the mean of the connection active time (CAT) as a function of the traffic load on the system for several scenarios.

The CAT is defined here as the time difference (in units of time) between the instant that a first request is generated at a secondary station, until the instant that this request (possibly as part of a multi-request if merged with other requests) is successfully received at the primary station. In FIG. 3, one unit of time corresponds to the duration of a single-request frame and an access request takes up one third of such frame.

The curves that are drawn in FIG. 3 show the mean CAT without merging (sc. 1) and with merging (sc. 2), the latter for R=1, 2, 3, 4 and 5, as indicated in the legend of FIG. 3. In addition, two curves depict analytical results (anal.) that validate the simulation results. For a relatively high traffic load, the mean CAT decreases significantly when merging is applied and when R increases. Only merging with R=1 approaches the relatively large mean CAT of not merging (sc. 1). This is no surprise, as merging with R=1 corresponds to servicing the service flows of an individual secondary station in FCFS order.

For a relatively low traffic load however, the reverse effect is observed: the mean CAT increases significantly when R increases.

This implies that making R dependent on the traffic load pays off in terms of a lower mean CAT, with R=1 for a relatively low traffic load and increasing R to 4 or 5 towards a relatively high traffic load.

The invention claimed is:

1. A shared medium communication system comprising:
   a primary station having a processor arranged to receive an access request, process the access request and send a grant in response to the access request;
   a secondary station having a processor for sending the access request and for receiving the grant; and
   a shared medium coupling the primary station with the secondary station,
   wherein the secondary station is arranged to merge several access requests into a multi request and send the multi request to the primary station, and wherein the primary station is arranged to receive the multi request, process the multi request and send the grant in response to the access requests merged in the multi request, and
   wherein the secondary station is arranged to adapt the merging of the access requests in dependence on histories of access requests previously merged, multi requests previously sent and grants previously received.

2. The shared medium communication system as claimed in claim 1, wherein the secondary station is arranged to adapt the sending of the multi request in dependence on histories of access requests previously merged, multi requests previously sent and grants previously received.

3. The shared medium communication system of claim 1, wherein the traffic load is predicted from the histories of access requests previously merged multi requests previously sent and grants previously received.

4. A secondary station having a processor arranged to:
   send an access request to a primary station;
   receive a grant from the primary station in response to the access request, the access request comprising a request for access to a shared medium;
   merge several access requests into a multi request and send the multi request to the primary station, and
   adapt the merging of the access requests in dependence on histories of access requests previously merged, multi requests previously sent and grants previously received.

5. The secondary station as claimed in claim 4, wherein the secondary station is arranged to adapt the sending of the multi request in dependence on histories of access requests previously merged, multi requests previously sent and grants previously received.

6. A primary station having a processor arranged to:
   receive an access request from a secondary station;
   process the access request and for sending a grant to the secondary station in response to the access request, the access request comprising a request for access to a shared medium;
   receive a multi request containing several merged access requests, process the multi request and send the grants to the secondary station in response to the access requests in the multi request;
   wherein the secondary station has a processor arranged to adapt the merging of the access requests in dependence on histories of access requests previously merged, multi requests previously sent and grants previously received.

7. A method of operating a shared medium communication system, the method comprising the acts of:
   a primary station having a processor and receiving an access request, processing the access request, and sending a grant in response to the access request;
   a secondary station having a processor and sending the access request to and receiving the grant from the primary station, the access request comprising a request for access to a shared medium;
   the secondary station merging several access requests into a multi request and sending the multi request to the primary station, wherein the merging act is adapted in dependence on histories of access requests previously merged, multi requests previously sent and grants previously received, and
   the primary station receiving the multi request, processing the multi request and sending the grants in response to the access requests merged in the multi request.

8. The method as claimed in claim 7, the sending act is adapted in dependence on histories of access requests previously merged, multi requests previously sent and grants previously received.

9. A method comprising an act of:
- sending an access request from a secondary station to a primary station;
- receiving by the secondary station a grant from the primary station in response to the access request, the access request comprising a request for access to a shared medium;
- merging by the secondary station several access requests into a multi request; and
- sending by the secondary station the multi request to the primary station and
- receiving the multi request by the primary station, processing the multi request and sending grants in response to the access requests merged in the multi request;

wherein the merging act is adapted in dependence on histories of access requests previously merged, multi requests previously sent and grants previously received.

10. A method of receiving an access request from a secondary station, processing the access request and sending a grant to the secondary station in response to the access request, the access request comprising a request for access to a shared medium, wherein the method comprises the acts of:
- receiving a multi request comprising merged access requests, processing the multi request; and
- sending the grants to the secondary station in response to the access requests merged in the multi request, wherein a number of requests merged into the multi request is adapted in dependence on histories of access requests previously merged, multi requests previously sent and grants previously received.

* * * * *